US008091532B2

(12) United States Patent
Wang et al.

(10) Patent No.: US 8,091,532 B2
(45) Date of Patent: Jan. 10, 2012

(54) DIAGNOSTIC SYSTEMS AND METHODS FOR A PRESSURE SENSOR DURING DRIVING CONDITIONS

(75) Inventors: Wenbo Wang, Novi, MI (US); Michael J. Lucido, Northville, MI (US); Christopher R. Graham, Lake Orion, MI (US)

(73) Assignee: GM Global Technology Operations LLC

( * ) Notice: Subject to any disclaimer, the term of this patent is extended or adjusted under 35 U.S.C. 154(b) by 360 days.

(21) Appl. No.: 12/509,686

(22) Filed: Jul. 27, 2009

(65) Prior Publication Data

US 2010/0274462 A1 Oct. 28, 2010

Related U.S. Application Data

(60) Provisional application No. 61/171,556, filed on Apr. 22, 2009, provisional application No. 61/171,600, filed on Apr. 22, 2009.

(51) Int. Cl.
*F02M 55/02* (2006.01)
*G01M 15/00* (2006.01)

(52) U.S. Cl. ...................... 123/446; 123/458; 73/114.43

(58) Field of Classification Search .................. 123/457, 123/458, 446, 447, 198 D, 198 DB; 73/114.38, 73/114.43; 701/103, 107, 114, 115
See application file for complete search history.

(56) References Cited

U.S. PATENT DOCUMENTS 5,983,714 A * 11/1999 Izumiura et al. ........... 73/114.43
6,024,064 A * 2/2000 Kato et al. ............... 123/179.17
6,076,504 A * 6/2000 Stavnheim et al. ........... 123/447
6,578,555 B2 * 6/2003 Sykes ........................... 123/479
6,647,769 B1 * 11/2003 Fujino et al. ............... 73/114.41
7,121,265 B2 * 10/2006 Joos et al. ..................... 123/494
7,134,413 B2 * 11/2006 Cho ......................... 123/179.17
7,472,690 B2 * 1/2009 Takayanagi et al. .......... 123/446
7,556,023 B2 * 7/2009 Ilhoshi et al. ................. 123/480
7,717,088 B2 * 5/2010 Thomas ........................ 123/478
7,765,991 B2 * 8/2010 Thomas et al. ............... 123/520
7,891,340 B2 * 2/2011 Surnilla et al. ................ 123/457
7,980,120 B2 * 7/2011 Cinpinski et al. .......... 73/114.43
7,987,704 B2 * 8/2011 Lucido et al. .............. 73/114.43
2007/0251502 A1 * 11/2007 Takayanagi et al. .......... 123/458
2009/0205413 A1 * 8/2009 Yamauchi et al. ......... 73/114.41
2010/0122690 A1 * 5/2010 Miyake et al. ................ 123/457
2010/0274462 A1 * 10/2010 Wang et al. ................... 701/102
2010/0280742 A1 * 11/2010 Gwidt et al. .................. 701/103

OTHER PUBLICATIONS

U.S. Appl. No. 12/509,653, filed Jul. 27, 2009, Michael J. Lucido.

* cited by examiner

*Primary Examiner* — Thomas Moulis

(57) ABSTRACT

A diagnostic system includes a fuel pump module and a diagnostic control module. The fuel pump module activates a first pump when an engine is operating in a diagnostic mode. The first pump supplies fuel to fuel injectors of the engine via a fuel rail. The diagnostic control module receives a measured pressure signal from a pressure sensor that indicates a pressure of the fuel rail during the diagnostic mode. The fuel pump module sends at least one of a first and a second commanded fuel pressure signal to the first pump based on a predetermined relief pressure of a pressure relief valve. The diagnostic control module detects a fault of the pressure sensor based on an engine speed and a comparison between the measured pressure signal and at least one of the first commanded fuel pressure signal and a corrected relief pressure of the pressure relief valve.

20 Claims, 8 Drawing Sheets

DIAGNOSTIC SYSTEMS AND METHODS FOR A PRESSURE SENSOR DURING DRIVING CONDITIONS

CROSS-REFERENCE TO RELATED APPLICATIONS

This application claims the benefit of U.S. Provisional Application No. 61/171,556, filed on Apr. 22, 2009 and U.S. Provisional Application No. 61/171,600, filed on Apr. 22, 2009. The disclosures of the above applications are incorporated herein by reference in their entirety.

FIELD

The present disclosure relates to vehicle control systems for internal combustion engines, and more particularly to diagnostic systems and methods for pressure sensors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A spark ignition direct injection (SIDI) system directly injects pressurized fuel into cylinders of an engine. In contrast, a port fuel injection system injects fuel into an intake manifold or port upstream from an intake valve of a cylinder. A SIDI system enables stratified fuel-charged combustion for improved fuel efficiency and reduced emissions during operation. The stratified fuel charge allows for a lean burn and improved power output.

A SIDI engine may be configured with a low-pressure fuel pump and a high-pressure fuel pump, which are used for pressurizing respectively a low-pressure fuel line and an injector fuel rail. A pressure sensor may be attached to the injector fuel rail and generate a fuel rail pressure signal. An engine control system may control the amount of fuel delivered to the cylinders based on the fuel rail pressure signal.

SUMMARY

In one embodiment, a diagnostic system is provided that includes a fuel pump module and a diagnostic control module. The fuel pump module activates a first pump when an engine is operating in a diagnostic mode. The first pump supplies fuel to fuel injectors of the engine via a fuel rail. The diagnostic control module receives a measured pressure signal from a pressure sensor that indicates a pressure of the fuel rail during the diagnostic mode. The fuel pump module sends at least one of a first commanded fuel pressure signal and a second commanded fuel pressure signal to the first pump based on a predetermined relief pressure of a pressure relief valve. The diagnostic control module detects a fault of the pressure sensor based on an engine speed and a comparison between the measured pressure signal and at least one of the first commanded fuel pressure signal and a corrected relief pressure of the pressure relief valve.

In other features, a method of diagnosing a pressure sensor is provided. The method includes activating a first pump when an engine is operating in a diagnostic mode. Fuel is supplied to fuel injectors of the engine via a fuel rail. A measured pressure signal is received from a pressure sensor that indicates a pressure of the fuel rail during the diagnostic mode. At least one of a first commanded fuel pressure signal and a second commanded fuel pressure signal is sent to the first pump based on a predetermined relief pressure of a pressure relief valve. A fault of the pressure sensor is detected based on an engine speed and a comparison between the measured pressure signal and at least one of the first commanded fuel pressure signal and a corrected relief pressure of the pressure relief valve.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
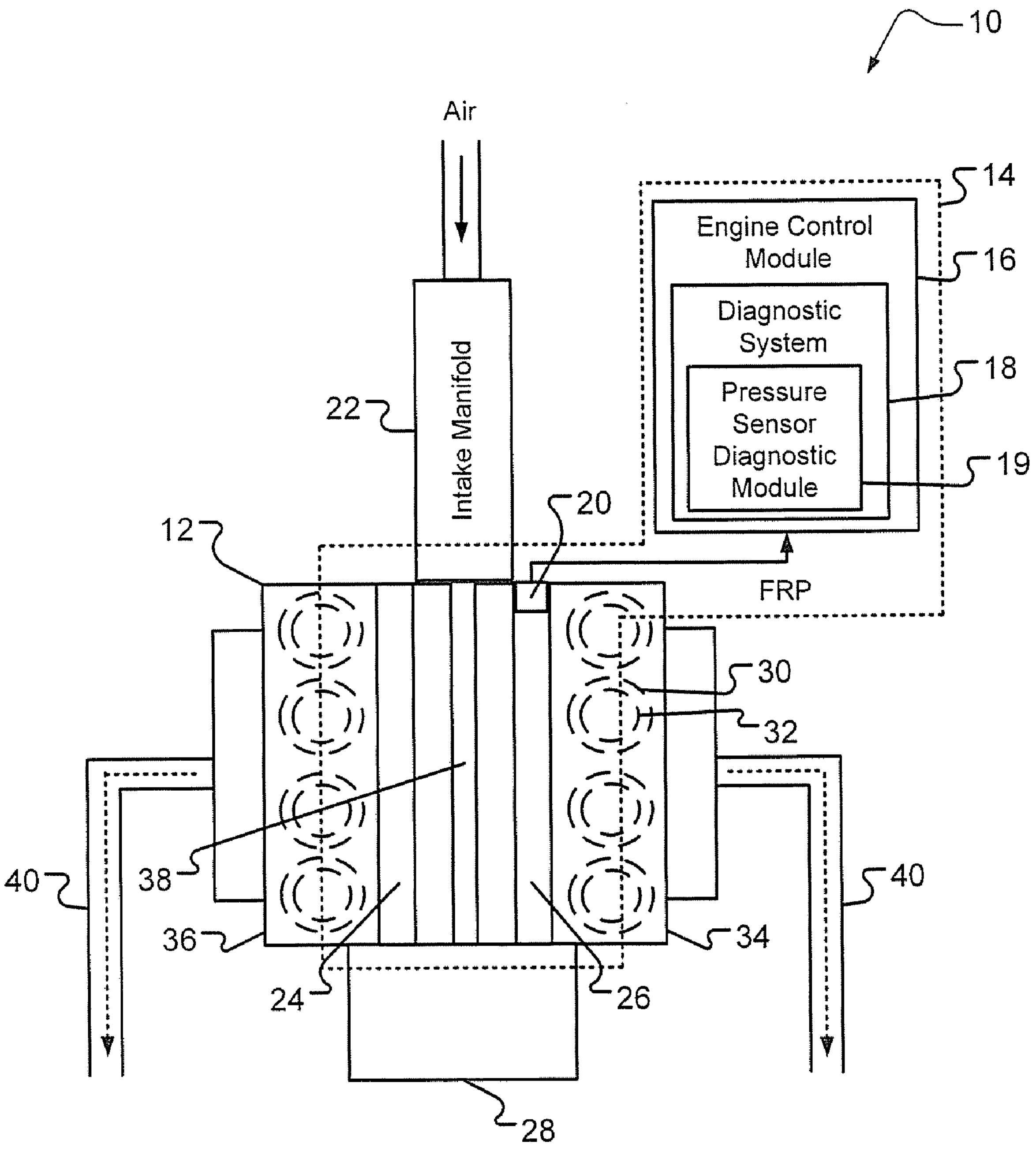
FIG. 1 is a functional block diagram of an engine system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In addition, although the following embodiments are described primarily with respect to a SIDI engine, the embodiments of the present disclosure may apply to other types of engines. For example, the present invention may apply to compression ignition, spark ignition, spark ignition direct injection, homogenous spark ignition, homogeneous charge compression ignition, stratified spark ignition, diesel, and spark assisted compression ignition engines.

An engine may include a fuel control system and an emission control system to regulate delivery of fuel to cylinders of the engine. The fuel control system and the emission control system may adjust a fuel supply pressure and/or an amount of fuel supplied to the engine based on a pressure signal from a fuel pressure sensor. The fuel pressure sensor generates the pressure signal based on a fuel pressure inside a fuel rail of the engine. The pressure signal may indicate an improper pressure value when the fuel pressure sensor is faulty. A faulty fuel pressure sensor can cause errors in the fuel control system and the emission control system.

A diagnostic trouble code (DTC) may be failed due to a fault of a fuel pressure sensor. A no trouble found (NTF) condition may occur when a diagnostic system for the fuel control system fails a DTC when a fault of a fuel pressure sensor exists. Troubleshooting NTF conditions is time consuming. The embodiments of the present disclosure provide techniques for diagnosing a fuel pressure sensor during a driving condition. The driving condition refers to an engine operation where an engine speed is within a predetermined speed range window. The techniques may improve air/fuel and emission control, as well as reduce the number of NTF conditions.

Referring now to FIG. 1, an exemplary engine control system 10 of a vehicle is shown. The engine control system 10 includes an engine 12 and a fuel injection system 14. The fuel injection system 14 includes an engine control module 16 with a diagnostic system 18. The diagnostic system 18 may include a pressure sensor diagnostic module 19, as well as other devices, timers, etc. An example of the diagnostic system 18 is shown in FIG. 3. The pressure sensor diagnostic module 19 may detect a fault of a pressure sensor 20 while the engine 12 is operating in a driving condition. The pressure sensor diagnostic module 19 may also determine a proportional offset of a pressure sensor from a nominal or actual value of the pressure sensor. The pressure sensor 20 may transmit a measured pressure signal FRP to the diagnostic system 18. The diagnostic system 18 may determine the fault of the pressure sensor 20. Examples of the engine control module 16 and the diagnostic system 18 are shown in FIGS. 2 and 3.

The engine 12 includes an intake manifold 22, the fuel injection system 14 with fuel rails 24, 26, a transmission 28, a cylinder 30, and a piston 32. The exemplary engine 12 includes eight cylinders 30 configured in adjacent cylinder banks 34, 36 in a V-type layout. Although FIG. 1 depicts eight cylinders, the engine 12 may include any number of cylinders 30. The engine 12 may also have an inline-type cylinder configuration.

During engine operation, air is drawn into the intake manifold 22 by an inlet vacuum created by intake strokes of the engine 12. Fuel is directly injected by the fuel injection system 14 into the cylinders 30. The air and fuel mixes in the cylinders 30 and heat from the compression and/or electrical energy ignites the air/fuel mixture. The piston 32 in the cylinder 30 drives a crankshaft 38 of the engine 12 to produce drive torque. Combusted air/fuel mixture within the cylinder 30 is forced out through exhaust conduits 40.

Figure 2:
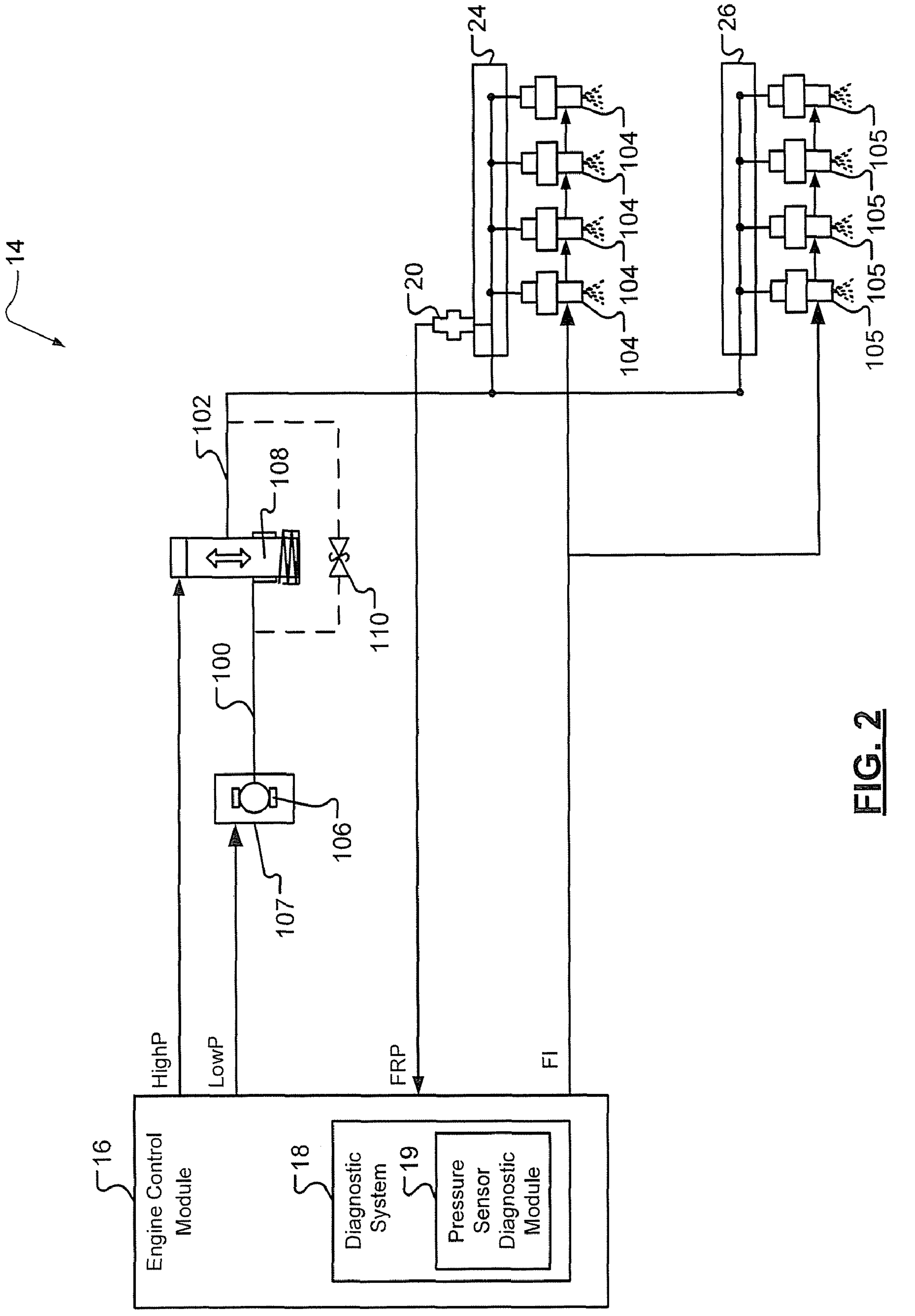
FIG. 2 is a functional block diagram of a fuel injection system in accordance with an embodiment of the present disclosure.
Figure 3:
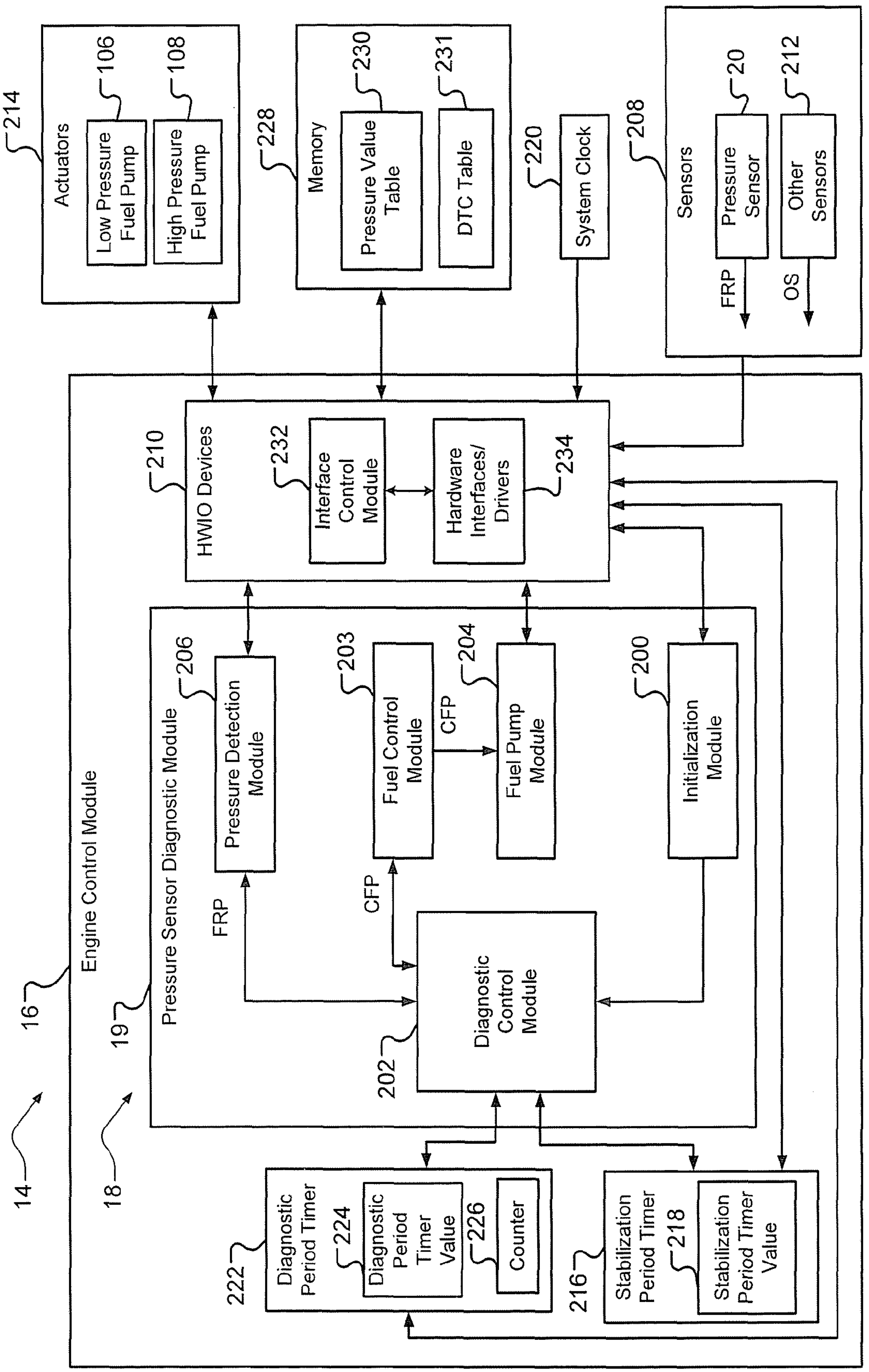
FIG. 3 is a functional block diagram of the fuel injection system of FIG. 2 illustrating a diagnostic system for a pressure sensor in accordance with an embodiment of the present disclosure.

In FIG. 2, the fuel injection system 14 is shown. The fuel injection system 14 includes the engine control module 16, the diagnostic system 18, and the pressure sensor diagnostic module 19 for the pressure sensor 20. A low-pressure fuel line 100 and a high-pressure fuel line 102 are connected to the fuel rails 24, 26, and fuel injectors 104, 105. The fuel lines 100, 102 receive fuel by a respective one of a low-pressure fuel pump (second pump) 106 and a high-pressure fuel pump (first pump) 108. The low-pressure fuel pump (second pump) 106 located in a fuel tank 107 may operate off of an electrical power source, such as a battery. The high-pressure fuel pump (first pump) 108 may operate off of the engine 12. The high-pressure fuel pump (first pump) 108 provides a higher fuel pressure than and/or increases a fuel pressure provided by the low-pressure fuel pump (second pump) 106. The low-pressure fuel pump (second pump) 106 may provide a fuel pressure of, for example, 400 kilopascal (kPa=$10^3$ Pa)+/−50 kPa. The high-pressure fuel pump (first pump) 108 may provide a fuel pressure of, for example, 15 megapascal (mPa=$10^6$ Pa)+/−1 mPa.

The high-pressure fuel pump (first pump) 108 may include a pressure relief valve 110. The pressure relief valve 110 may be a device that provides a passageway having an inlet end in communication with the high-pressure fuel pump (first pump) 108 and an outlet end in communication with the low-pressure fuel line 100. The pressure relief valve 110 may be connected between the low-pressure fuel line 100 and the high-pressure fuel line 102. The pressure relief valve 110 may open to relieve pressure from the high-pressure fuel line 102 when pressure within the high-pressure fuel line 102 is greater than a predetermined pressure.

In use, the engine control module 16 generates a low-pressure control signal LowP to pump fuel from the fuel tank 107 to the low-pressure fuel line 100 via the low-pressure fuel pump (second pump) 106. The engine control module 16 generates a high-pressure control signal HighP to pump fuel into the cylinders 30. The high-pressure fuel pump (first pump) 108 is used to increase pressure of the fuel received from the low-pressure fuel line 100. High-pressured fuel is provided to the high-pressure fuel line 102 and the fuel rails 24, 26. The high-pressured fuel is injected into the cylinders 30 via the fuel injectors 104, 105. Timing of the fuel injectors 104, 105 is controlled by the engine control module 16. Although a particular number of fuel rails and fuel injectors per fuel rail are shown, any number of fuel rails and corresponding fuel injectors may be included.

The engine control module 16 controls the fuel pumps 106, 108 in response to various sensor inputs, such as a measured pressure signal FRP from the pressure sensor 20. Pressure sensors may be connected to and detect pressure in one or more of the fuel rails 24, 26, 102. The pressure sensor 20 is shown as one example. The engine control module 16 may generate various control signals, such as the low-pressure control signal LowP, the high-pressure control signal HighP, and a fuel injector control signal FI. The fuel injector control signal FI may be used to control opening and closing of the fuel injectors 104, 105.

Fuel is stored in the fuel tank 107. The engine control module 16 may transmit the low-pressure control signal LowP to the low-pressure fuel pump (second pump) 106. The low-pressure fuel pump (second pump) 106 pumps fuel from the fuel tank 107 via the low-pressure fuel line 100. The engine control module 16 may transmit the high-pressure control signal HighP to the high-pressure fuel pump (first pump) 108. The high-pressure fuel pump (first pump) 108 pumps fuel for delivery to the fuel injectors 104, 105, via the high-pressure fuel line 102 that is connected to the fuel rails 24, 26.

Referring now also to FIG. 3, the fuel injection system 14 with the engine control module 16 illustrating the diagnostic system 18 for the pressure sensor 20 is shown. The diagnostic system 18 may include the pressure sensor diagnostic module 19. The pressure sensor diagnostic module 19 may include an initialization module 200, a diagnostic control module 202, a fuel control module 203, a fuel pump module 204, and a pressure detection module 206.

The initialization module 200 may receive signals from sensors 208 via hardware input/output (HWIO) devices 210.

The sensors 208 may include the pressure sensor 20, and other sensors 212. The other sensors 212 may include an engine speed sensor, an intake air temperature (IAT) sensor, a humidity IAT sensor, and/or an oxygen sensor. The initialization module 200 may generate an initialization signal when the engine 12 has operated at a speed within a predetermined speed range window for a predetermined period. The initialization module 200 may transmit the initialization signal to the diagnostic control module 202, indicating the engine 12 is operating in a diagnostic mode.

The diagnostic control module 202 receives the initialization signal and enables the fuel control module 203. The fuel control module 203 signals the fuel pump module 204 to operate actuators 214 via the HWIO devices 210. The actuators 214 may include the low-pressure fuel pump (second pump) 106 and the high-pressure fuel pump (first pump) 108. The fuel control module 203 generates a commanded fuel pressure signal CFP for the high-pressure fuel pump (first pump) 108 to apply a predetermined fuel pressure to the high-pressure fuel line 102. The commanded fuel pressure signal CFP is determined based on a predetermined relief pressure value. The predetermined relief pressure value is designed for the pressure relief valve 110 to open when a pressure buildup in the high-pressure fuel line 102 is above a threshold. The fuel control module 203 transmits the commanded pressure signal CFP to the diagnostic control module 202 and the fuel pump module 204.

The fuel pump module 204 increases an output pressure of the high-pressure fuel pump (first pump) 108 based on the commanded pressure signal CFP. The diagnostic control module 202 activates a stabilization period timer 216. The stabilization period timer 216 may include a stabilization period timer value 218. The stabilization period timer 216 measures time spent to stabilize fuel pressures in the low-pressure fuel line 100, the high-pressure fuel line 102, and the fuel rails 24, 26. The stabilization period timer 216 increases the stabilization period timer value 218 based on a clock signal received from a system clock 220 via the HWIO devices 210. When the stabilization period timer value 218 is greater than a predetermined period, the diagnostic control module 202 enables the pressure detection module 206.

The pressure detection module 206 generates and transmits a measured pressure signal FRP from the pressure sensor 20 to the diagnostic control module 202. The diagnostic control module 202 activates a diagnostic period timer 222. The diagnostic period timer 222 may include a diagnostic period timer value 224 and a counter 226. The diagnostic period timer 222 measures time spent to diagnose the pressure sensor 20. The counter 226 is used in determining pressure differences between pressure signals, as described below.

The diagnostic control module 202 calculates a pressure difference ΔP between the commanded fuel pressure signal CFP and the measured pressure signal FRP. In addition, the diagnostic control module 202 may calculate the pressure difference ΔP between a corrected relief pressure value and the measured pressure signal FRP. The corrected relief pressure value is determined based on a manufacturing offset and the designed nominal or actual relief pressure value. A set of the pressure differences ΔP may be stored in memory 228. A pressure value table 230 in the memory 228 may be used to store the set of the pressure differences ΔP for a predetermined diagnostic period. The memory 228 may also store a DTC table 231. The DTC table 231 may include pressure values detected and DTCs generated during the low and high proportional offset tests.

The HWIO devices 210 may include an interface control module 232 and hardware interfaces/drivers 234. The interface control module 232 provides an interface between the modules 200, 202, 204, 206, and the hardware interfaces/drivers 234. The hardware interfaces/drivers 234 control operation of, for example, fuel pumps 106, 108, and other engine system devices. The other engine system devices may include ignition coils, spark plugs, throttle valves, solenoids, etc. The hardware interface/drivers 234 also receive sensor signals, which are communicated to the respective control modules. The sensor signals may include the measured pressure signal FRP from the pressure sensor 20 and signals OS from other sensors 212.

Figure 4A:
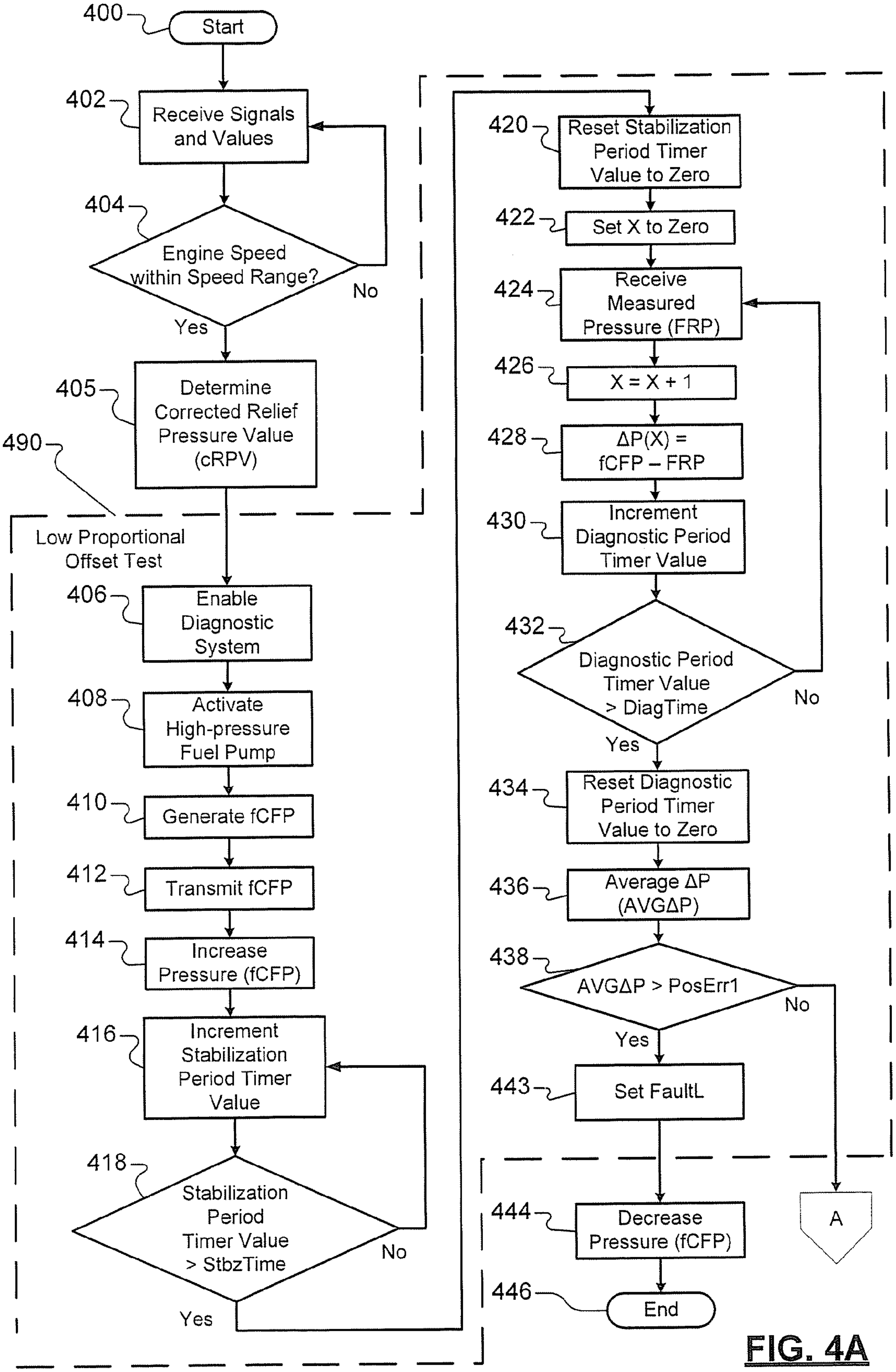
FIGS. 4A and 4B illustrate a method of diagnosing a pressure sensor in accordance with an embodiment of the present disclosure.
Figure 4B:
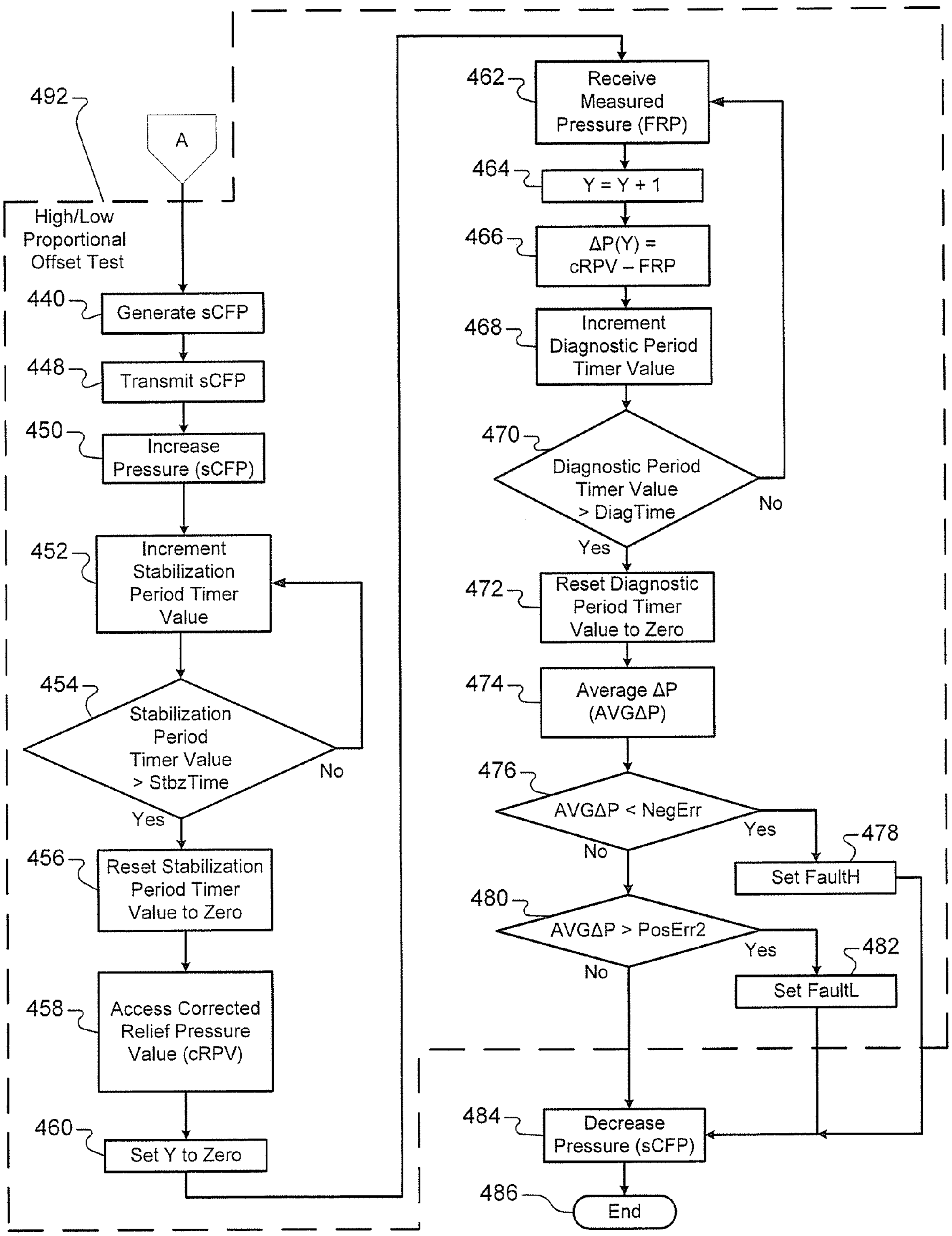

Referring now also to FIG. 4, a method of diagnosing a pressure sensor 20 is shown. The method may include a low proportional offset test 490 and/or a high/low proportional offset test 492. The low proportional offset test 490 may include generation of a commanded fuel pressure signal that is less than a predetermined relief pressure value RPV. The high proportional offset test 492 may include generation of a commanded fuel pressure signal that is greater than a predetermined relief pressure value RPV. The predetermined relief pressure value RPV may represent a fuel pressure value of the high-pressure fuel line 102 when the pressure relief valve 110 opens due to a pressure buildup in the high-pressure fuel line 102.

The test 490 may detect a low proportional offset fault of the pressure sensor 20 when a measured pressure signal FRP is less than the predetermined relief pressure value RPV and less than a commanded fuel pressure CFP by a predetermined amount. The test 492 may detect a high proportional offset fault or a low proportional offset fault of the pressure sensor 20 when the measured pressure signal FRP is greater or less than the predetermined relief pressure value RPV by a predetermined amount. The high proportional offset test 492 may depend on or be independent of the low proportional offset test 490 and vice versa. Although the following steps are primarily described with respect to the embodiments of FIGS. 1-3, the steps may be modified to apply to other embodiments of the present invention.

The method may begin at step 400. In step 402, signals from the sensors 208 and values in the memory 228 may be received and/or generated. The signals may include the measured pressure signal FRP from the pressure sensor 20. The pressure value table 230 and the DTC table 231 may include pressure values detected and DTCs generated during the low and high proportional offset tests 490, 492. The signals may be transmitted to modules, such as the initialization module 200, the diagnostic control module 202, the fuel pump module 204, and the pressure detection module 206 via the HWIO devices 210.

In step 404, when the engine 12 has operated at a speed within a predetermined speed range window for a predetermined period, control may proceed to step 406. This satisfies the driving condition for the low and high proportional offset tests 490, 492. Otherwise, control may return to step 402. The initialization module 200 generates and transmits an initialization signal to the diagnostic control module 202.

In step 405, the diagnostic control module 202 may determine a corrected relief pressure value cRPV based on an actual relief pressure of the pressure relief valve 110. The corrected relief pressure value cRPV refers to an actual relief pressure of the pressure relief valve 110. Actual relief pressures of relief valves can vary from a predetermined or expected relief pressure due to manufacturing variations. Different pressure sensors of the same type may have different actual relief pressures. A relief valve offset Ofs that represents a difference between an actual relief pressure and an expected relief pressure may be determined during manufacturing and/or operation of the engine 12.

Figure 5:
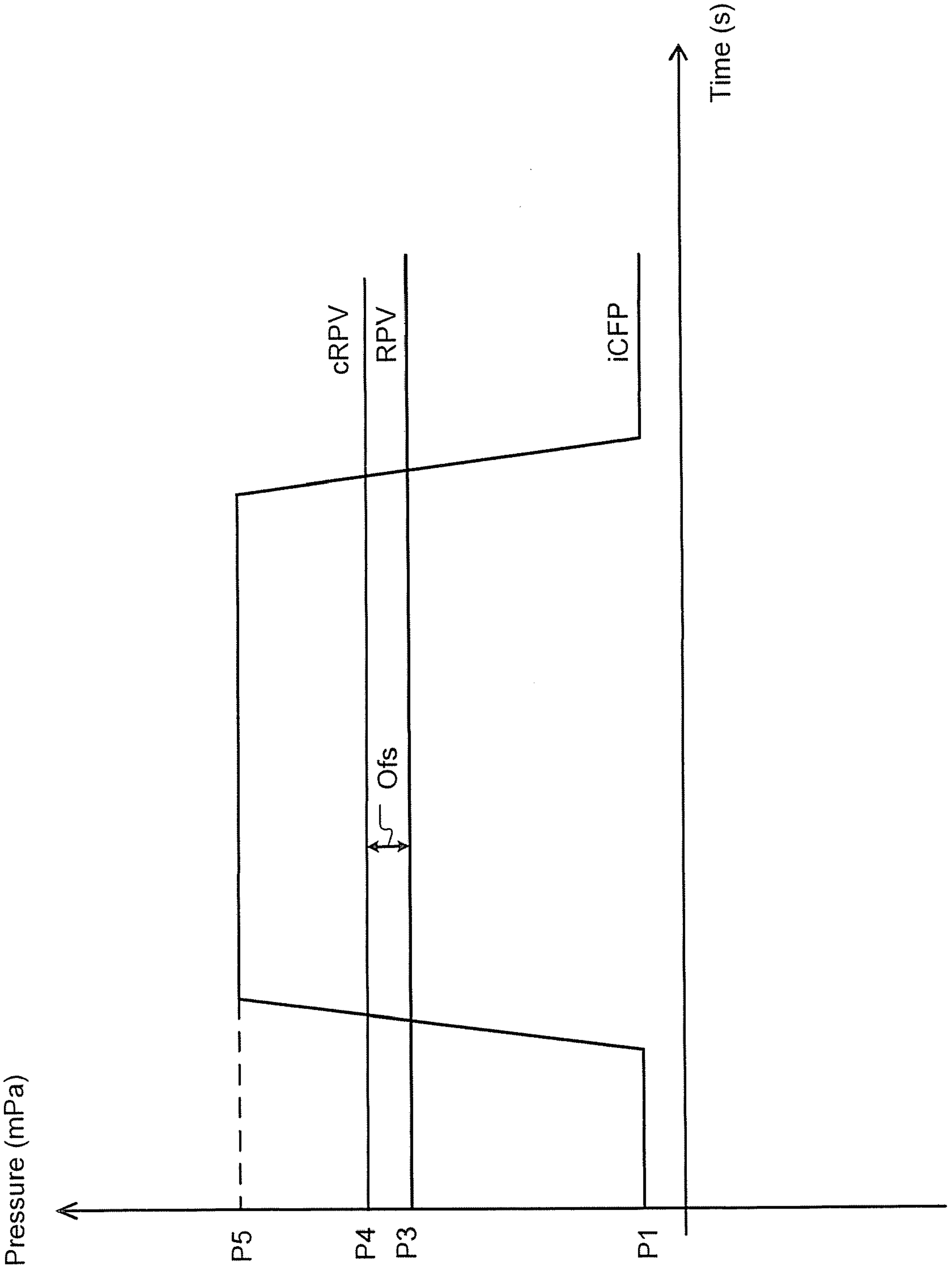
FIG. 5 is an exemplary plot of a corrected relief pressure value in accordance with an embodiment of the present disclosure.

For example, referring now also to FIG. 5, an exemplary plot of the corrected relief pressure value CRPV is shown. The corrected relief pressure value cRPV may be made by summing the relief valve offset Ofs to the predetermined relief pressure value RPV. The fuel control module 203 may command the high-pressure fuel pump (first pump) 108 to increase fuel pressure in the high-pressure fuel line 102 until the pressure relief valve 110 opens. An initial commanded pressure signal iCFP (third commanded fuel pressure signal) generated by the fuel control module 203 may be set to a value P5 (e.g. 25 mPa) that is greater than the predetermined relief pressure value RPV by a predetermined amount. The pressure detection module 206 detects and transmits an actual relief pressure value of the pressure relief valve 110 to the diagnostic control module 202. The diagnostic control module 202 may store the actual corrected relief pressure value cRPV in the memory 228.

In step 406, the diagnostic control module 202 enables the fuel control module 203 of the diagnostic system 18 to begin the low proportional offset test 490. In step 408, the fuel control module 203 signals the fuel pump module 204 to activate the high-pressure fuel pump (first pump) 108.

In step 410, the fuel control module 203 initially generates and sets a first fuel commanded pressure signal fCFP to a value that is less than the predetermined relief pressure value RPV. For example only, referring now also to FIG. 6, an exemplary plot of fuel pressure signals in accordance with the embodiment of FIG. 3 is shown. The first commanded fuel pressure signal fCFP may be set to a first pressure P1 (e.g. 2 mPa). The predetermined relief pressure value RPV may be initially known as a third pressure P3 (e.g. 17.5 mPa) at the time of manufacturing.

In step 412, the fuel control module 203 transmits the first commanded fuel pressure signal fCFP to the diagnostic control module 202 and the fuel pump module 204. In step 414, the fuel pump module 204 commands the high-pressure fuel pump (first pump) 108 to increase fuel pressure in the high-pressure fuel line 102 based on the predetermined relief pressure value RPV. For example, the fuel pump module 204 commands the high-pressure fuel pump (first pump) 108 to increase the first commanded fuel pressure signal fCFP from the first pressure P1 (e.g. 2 mPa) to a second pressure P2 (e.g. 13 mPa). The second pressure P2 may be set to a value less than the predetermined relief pressure value RPV by a predetermined amount to avoid opening of the pressure relief valve 110. Frequently forcing the pressure relief valve 110 to open may cause damages to the fuel injection system 14 due to a high-pressure buildup in the high-pressure fuel line 102. Components throughout the fuel injection system 14 may not endure the high-pressure buildup after frequent pressure buildups.

In step 416, the diagnostic control module 202 activates the stabilization period timer 216 to wait for a predetermined amount of time for stabilizing fuel pressure in the low-pressure fuel line 100, the high-pressure fuel line 102, and the fuel rails 24, 26. For example, the stabilization period timer 216 accesses the system clock 220 via the HWIO devices 210 to receive an initial timestamp of when the first commanded fuel pressure signal fCFP is increased. The stabilization period timer 216 compares the initial timestamp with a current timestamp based on a clock signal received from the system clock 220. The stabilization period timer 216 increases the stabilization period timer value 218 based on a time difference between the timestamps.

In step 418, when the stabilization period timer value 218 is greater than a predetermined stabilization period StbzTime, control may proceed to step 420. Otherwise, control may return to step 416. The stabilization period timer value 218 is compared to the predetermined stabilization period StbzTime. For example, in FIG. 6, point A refers to a start time of the stabilization period StbzTime when the first commanded fuel pressure signal fCFP is increased by the fuel pump module 204. Point B refers to an end time of the stabilization period StbzTime. The predetermined stabilization period StbzTime from point A to point B represents an amount of time to allow fuel pressures in the low-pressure and high-pressure fuel lines 100, 102, and the fuel rails 24, 26, to be stabilized.

In step 420, after the predetermined stabilization period StbzTime, the stabilization period timer 216 resets the stabilization period timer value 218 to zero. In step 422, the counter 226 of the diagnostic period timer 222 sets an index X to zero. X is an integer from zero to K, where K represents a number of pressure differences ΔP(X) stored in the pressure value table 230. The diagnostic control module 202 calculates and stores the pressure differences ΔP(X) between the first commanded fuel pressure signal fCFP and a measured pressure signal FRPLow. The measured pressure signal FRPLow represents a faulty pressure signal that is less than the first commanded pressure signal fCFP by a predetermined amount. The pressure differences ΔP(X) may be calculated during a predetermined diagnostic period DiagTime. Point B also refers to a start time of the predetermined diagnostic period DiagTime. Point C refers to an end time of the predetermined diagnostic period DiagTime.

In step 424, the pressure detection module 206 receives a fuel rail pressure signal from the pressure sensor 20 via the HWIO devices 210 to generate a measured pressure signal FRP. In step 426, the counter 226 of the diagnostic period timer 222 increments the index X by one. In step 428, the pressure detection module 206 transmits the measured pressure signal FRP to the diagnostic control module 202. The diagnostic control module 202 calculates the pressure difference ΔP(X) between the first commanded fuel pressure signal fCFP and the measured pressure signal FRP. The diagnostic control module 202 may determine the pressure difference ΔP(X) by subtracting the measured pressure signal FRP from the first commanded fuel pressure signal fCFP. The pressure difference ΔP(X) may be stored in the pressure value table 230 of the memory 228. The pressure value table 230 is updated by the diagnostic control module 202 during the predetermined diagnostic period DiagTime.

In step 430, the diagnostic control module 202 activates the diagnostic period timer 222. The diagnostic period timer 222 accesses the system clock 220 via the HWIO devices 210 to receive an initial timestamp of, for example, when the first commanded fuel pressure signal fCFP is increased. The diagnostic period timer 222 compares the initial timestamp with a current timestamp based on a clock signal received from the system clock 220. The diagnostic period timer 222 increases the diagnostic period timer value 224 based on a time difference between the timestamps.

In step 432, when the diagnostic period timer value 224 is greater than the predetermined diagnostic period DiagTime, control may proceed to step 434. Otherwise, control may return to step 424. In step 434, after the predetermined diagnostic period DiagTime, the diagnostic period timer 222 resets the diagnostic period timer value 224 to zero. In step 436, the diagnostic control module 202 accesses the pressure value table 230 to generate an average pressure AVGΔP of the pressure differences ΔP(X) stored during the predetermined diagnostic period DiagTime. The diagnostic control module 202 calculates the average pressure AVGΔP of the pressure differences ΔP(X). For example, the average pressure AVGΔP may be determined based on a sum of the pressure differences. For example only, the average pressure AVGΔP may be defined as provided by expression 1.

$$AVG\Delta P = \sum_{x=1}^{K} \frac{\Delta P(X)}{K} \tag{1}$$

X identifies a particular pressure difference and ΔP(X) is the pressure difference.

Figure 6:
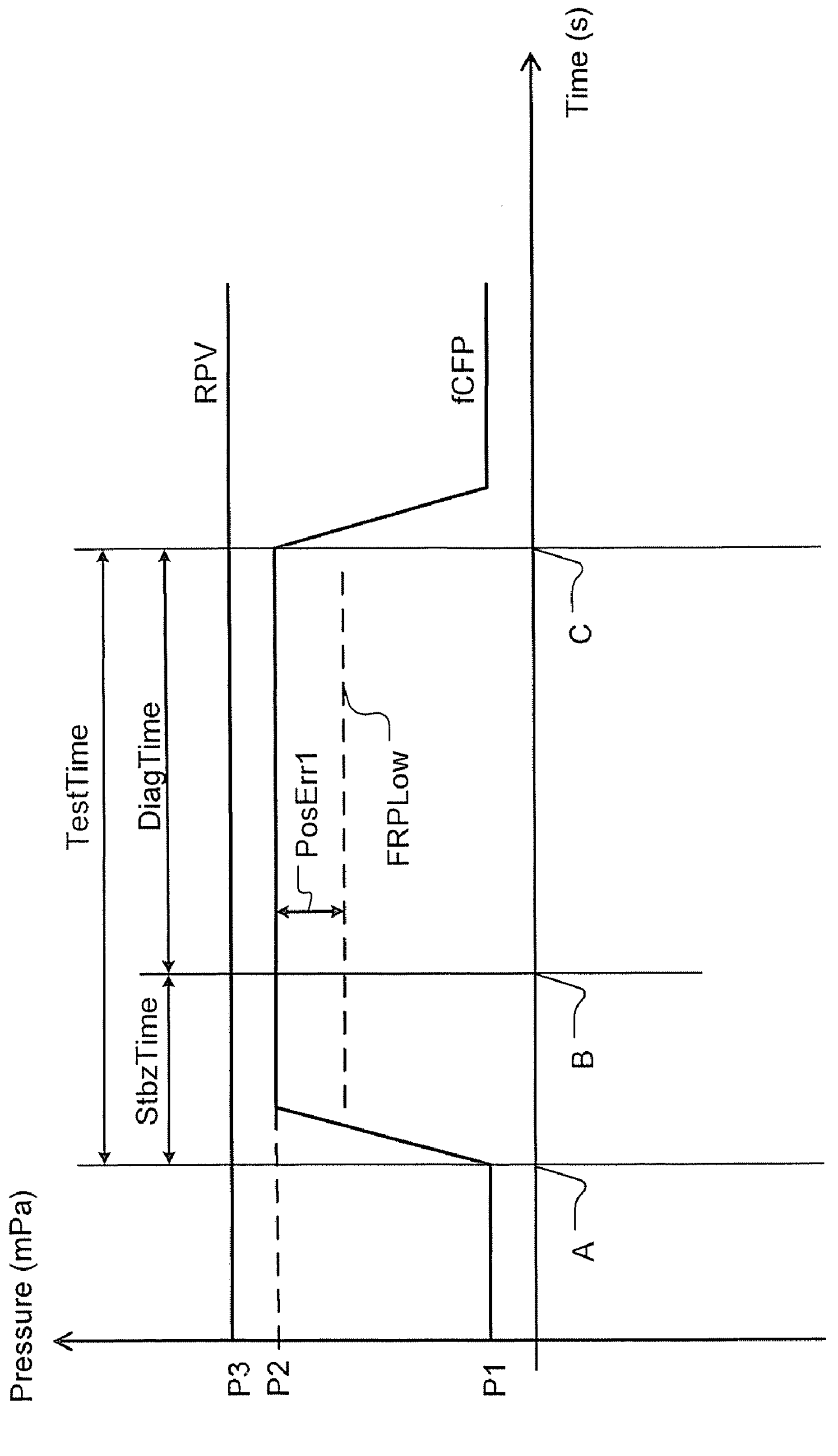
FIGS. 6 and 7 are exemplary plots of fuel pressure signals in accordance with the embodiment of FIG. 3.

In step 438, when the average pressure AVGΔP is greater than the predetermined positive offset PosErr1, control may proceed to step 443. Otherwise, control may proceed to step 440. For example only, the diagnostic control module 202 generates an average pressure AVGΔP based on the pressure differences ΔP(X) stored during the predetermined diagnostic period DiagTime. The measured pressure signal FRPLow shown in FIG. 6 is an example of a pressure signal of a faulty pressure sensor.

In step 443, the diagnostic control module 202 may generate a DTC FaultL indicating that the pressure sensor 20 is generating a pressure signal that is low or less than the sensor nominal or actual value. In step 444, the fuel pump module 204 commands the high-pressure fuel pump (first pump) 108 to decrease fuel pressure in the high-pressure fuel line 102. For example, at point C, the fuel pump module 204 commands the high-pressure fuel pump (first pump) 108 to decrease the first commanded fuel pressure signal fCFP from the second pressure P2 (e.g. 13 mPa) to the first pressure P1 (e.g. 2 mPa). Control may end at step 446. Points A-C may refer to predetermined times stored in the memory 228.

In step 440, the diagnostic control module 202 may begin the high proportional offset test 492. The high proportional offset test may be performed independent of the low proportional offset test or may be based on results of the low proportional offset test, as shown. The diagnostic control module 202 signals the fuel control module 203 to generate and initially set a second commanded fuel pressure signal sCFP to a value that is greater than the predetermined relief pressure value RPV. The second commanded fuel pressure signal sCFP may be set to a same value as the initial commanded fuel pressure signal iCFP (third commanded fuel pressure signal) shown in FIG. 5 or to a value less or greater than the initial commanded fuel pressure signal iCFP (third commanded fuel pressure signal).

Figure 7:
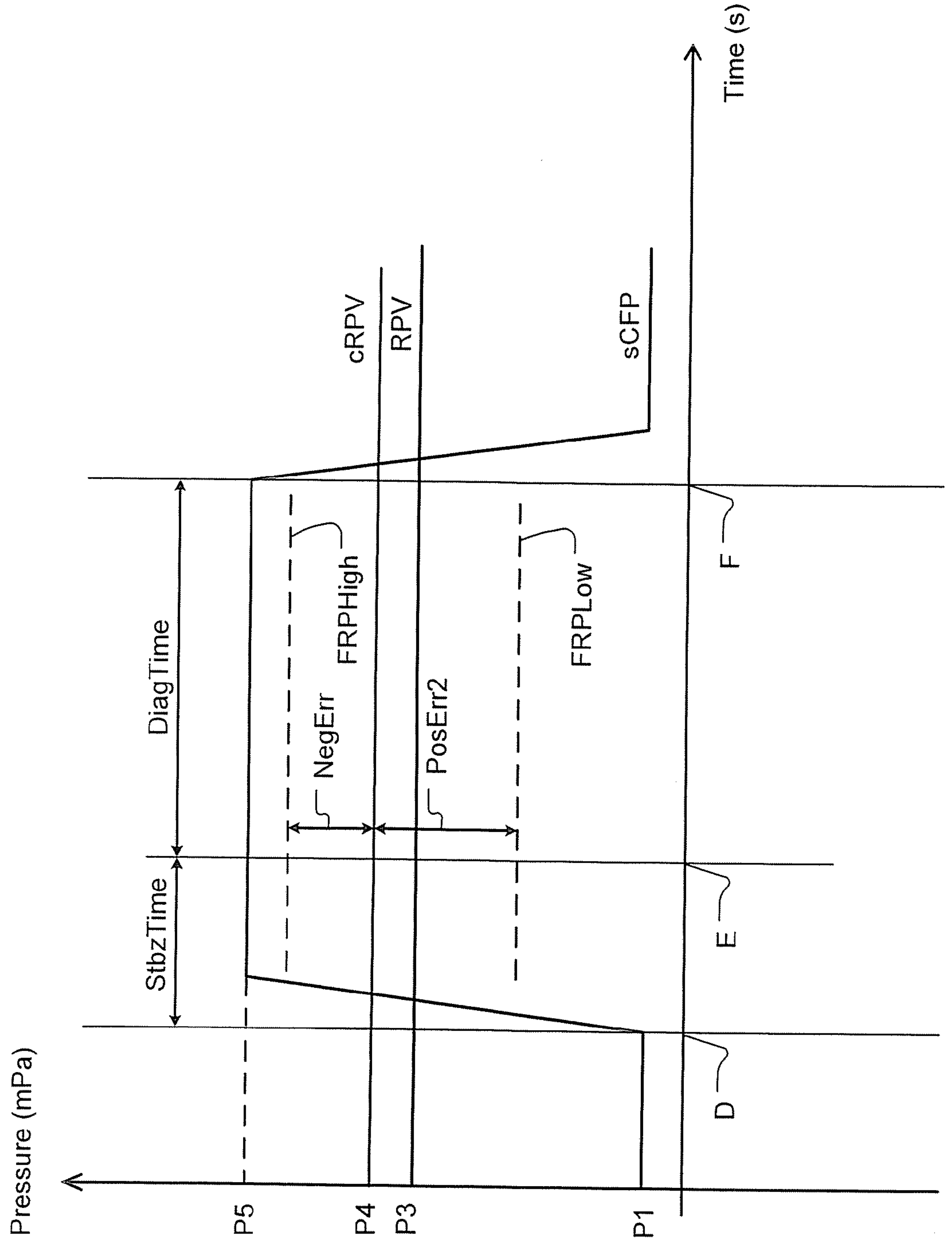

Referring now also to FIG. 7, an exemplary plot of fuel pressure signals in accordance with the embodiment of FIG. 3 is shown. The second commanded fuel pressure signal sCFP may be set to the first pressure P1 (e.g. 2 mPa). The predetermined relief pressure value RPV may be known as the third pressure P3 (e.g. 17.5 mPa) at the time of manufacturing.

In step 448, the fuel control module 203 transmits the second commanded fuel pressure signal sCFP to the diagnostic control module 202 and the fuel pump module 204. In step 450, the fuel pump module 204 commands the high-pressure fuel pump (first pump) 108 to increase fuel pressure in the high-pressure fuel line 102 based on the second commanded fuel pressure signal sCFP. For example, the fuel pump module 204 commands the high-pressure fuel pump (first pump) 108 to increase the second commanded fuel pressure signal sCFP from the first pressure P1 (e.g. 2 mPa) to a fifth pressure P5 (e.g. 25 mPa). The fifth pressure P5 may be set to a value greater than the predetermined relief pressure value RPV by a predetermined amount to force an opening of the pressure relief valve 110.

In step 452, the diagnostic control module 202 activates the stabilization period timer 216 to wait for a predetermined amount of time for stabilizing fuel pressure in the low-pressure fuel line 100, the high-pressure fuel line 102, and the fuel rails 24, 26. For example, the stabilization period timer 216 accesses the system clock 220 via the HWIO devices 210 to receive an initial timestamp of when the second commanded fuel pressure signal sCFP is increased. The stabilization period timer 216 compares the initial timestamp with a current timestamp based on a clock signal received from the system clock 220. The stabilization period timer 216 increases the stabilization period timer value 218 based on a time difference between the timestamps.

In step 454, when the stabilization period timer value 218 is greater than a predetermined stabilization period StbzTime, control may proceed to step 456. Otherwise, control may return to step 452. The stabilization period timer value 218 is compared to the predetermined stabilization period StbzTime. For example, in FIG. 7, point D refers to a start time of the stabilization period StbzTime when the second commanded fuel pressure signal sCFP is increased by the fuel pump module 204. Point E refers to an end time of the stabilization period StbzTime. The predetermined stabilization period StbzTime from point D to point E represents an amount of time to allow fuel pressures in the low-pressure and high-pressure fuel lines 100, 102, and the fuel rails 24, 26, to be stabilized.

In step 456, after the predetermined stabilization period StbzTime, the stabilization period timer 216 resets the stabilization period timer value 218 to zero. In step 458, the fuel control module 203 may access the corrected relief pressure value cRPV stored in the memory 228. In step 460, the counter 226 of the diagnostic period timer 222 sets an index Y to zero. Y is an integer from zero to L, where L is a number of pressure differences ΔP(Y) stored in the pressure value table 230. The diagnostic control module 202 calculates and stores the pressure differences ΔP(Y) between the corrected relief pressure value cRPV and a measured pressure signal FRP. The pressure differences ΔP(Y) may be calculated during a predetermined diagnostic period DiagTime. Point E also refers to a start time of the predetermined diagnostic period DiagTime. Point F refers to an end time of the predetermined diagnostic period DiagTime. Points E-F may refer to predetermined times that are stored in the memory 228.

In step 462, the pressure detection module 206 receives a fuel rail pressure signal from the pressure sensor 20 via the HWIO devices 210 to generate a measured pressure signal FRP. For example, as shown in FIG. 7, a faulty pressure sensor may generate at least one of a first measured pressure signal FRPHigh and a second measured pressure signal FRPLow. The first and second measured pressure signals FRPHigh, FRPLow are examples of faulty pressure signals of a faulty pressure sensor and/or are examples of when the pressure sensor 20 is operating in a faulty state. The measured pressure signal FRP may be one of two faulty pressure signals FRPHigh, FRPLow. A non-faulty pressure sensor may generate a pressure signal that is within a predetermined range of the corrected relief pressure value cRPV.

In step 464, the counter 226 of the diagnostic period timer 222 increments the index Y by one. In step 466, the pressure detection module 206 transmits the measured pressure signal FRP to the diagnostic control module 202. The diagnostic control module 202 calculates a pressure difference ΔP(Y) between the corrected relief pressure value cRPV and the measured pressure signal FRP. The diagnostic control module 202 subtracts the measured pressure signal FRP from the correct relief pressure value cRPV to determined the pressure difference ΔP(Y). The pressure difference ΔP(Y) may be stored in the pressure value table 230 of the memory 228. The pressure value table 230 is updated by the diagnostic control module 202 during the predetermined diagnostic period DiagTime.

In step 468, the diagnostic control module 202 activates the diagnostic period timer 222. The diagnostic period timer 222 accesses the system clock 220 via the HWIO devices 210 to receive an initial timestamp of, for example, when the second commanded fuel pressure signal sCFP is increased. The diagnostic period timer 222 compares the initial timestamp with a current timestamp based on a clock signal received from the system clock 220. The diagnostic period timer 222 increases the diagnostic period timer value 224 based on a time difference between the timestamps.

In step 470, when the diagnostic period timer value 224 is greater than the predetermined diagnostic period DiagTime, control may proceed to step 472. Otherwise, control may return to step 462. In step 472, after the predetermined diagnostic period DiagTime, the diagnostic period timer 222 resets the diagnostic period timer value 224 to zero. In step 474, the diagnostic control module 202 accesses the pressure value table 230 to generate an average pressure of the pressure differences ΔP(Y) stored during the predetermined diagnostic period DiagTime. The diagnostic control module 202 calculates the average pressure AVGΔP of the pressure differences ΔP(Y).

In step 476, when the average pressure AVGΔP is less than a predetermined negative offset NegErr, control may proceed to step 478. Otherwise, control may proceed to step 480. For example, as shown in FIG. 7, a first average pressure may be an average value of pressure differences ΔP(Y) between the corrected relief pressure value cRPV and the first measured pressure signal FRP. The pressure difference may be determined by subtracting the first measured pressure signal FRP from the corrected relief pressure value cRPV.

FRPHigh shown in FIG. 7 is an example of a pressure signal of a faulty pressure sensor. Because the first measured pressure signal FRPHigh is greater than the corrected relief pressure value cRPV, the first average pressure is a negative number. A DTC may be "failed" to indicate a fault of the pressure sensor 20 when the first average pressure is less than the predetermined negative offset NegErr. In step 478, the diagnostic control module 202 may generate a DTC FaultH. The DTC FaultH indicates that the pressure sensor 20 is generating a pressure signal that is greater than the sensor nominal or actual value because the pressure relief valve 110 is open and real or actual pressure is limited to the corrected relief pressure value cRPV.

In step 480, when the average pressure AVGΔP is greater than a predetermined positive offset PosErr2, control may proceed to step 482. Otherwise, control may proceed to step 484. For example, as shown in FIG. 7, a second average pressure may be an average value of pressure differences ΔP(Y) between the corrected relief pressure value cRPV and the second measured pressure signal FRP. The pressure difference may be determined by subtracting the second measured pressure signal FRP from the corrected relief pressure value cRPV.

FRPLow shown in FIG. 7 is another example of a pressure signal of a faulty pressure sensor. Because the second measured pressure signal FRPLow is less than the corrected relief pressure value cRPV, the second average pressure is a positive number. A DTC may be "failed" to indicate a fault of the pressure sensor 20 when the second average pressure is greater than the predetermined positive offset PosErr2. The predetermined positive offset PosErr2 may be greater than the predetermined positive offset PosErr1. In step 482, the diagnostic control module 202 may generate a DTC FaultL. The DTC FaultL indicates that the pressure sensor 20 is generating a pressure signal that is less than sensor nominal or actual value because the pressure relief valve 110 is open and real (or actual) pressure is limited to the corrected relief pressure value cRPV.

In step 484, the fuel pump module 204 commands the high-pressure fuel pump (first pump) 108 to decrease fuel pressure in the high-pressure fuel line 102. For example, at point F, the fuel pump module 204 commands the high-pressure fuel pump (first pump) 108 to decrease the second commanded fuel pressure signal sCFP from the fifth pressure P5 (e.g. 25 mPa) to the first pressure P1 (e.g. 2 mPa). Control may end at step 486.

The above-described steps are meant to be illustrative examples; the steps may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system comprising:
a fuel pump module that activates a first pump when an engine is operating in a diagnostic mode,
wherein the first pump supplies fuel to fuel injectors of the engine via a fuel rail; and
a diagnostic control module that receives a measured pressure signal from a pressure sensor that indicates a pressure of the fuel rail during the diagnostic mode,
wherein the fuel pump module sends at least one of a first commanded fuel pressure signal and a second commanded fuel pressure signal to the first pump based on a predetermined relief pressure of a pressure relief valve, and
wherein the diagnostic control module detects a fault of the pressure sensor based on an engine speed and a comparison between the measured pressure signal and at least one of the first commanded fuel pressure signal and a corrected relief pressure of the pressure relief valve.

2. The diagnostic system of claim 1, wherein the fuel pump module activates a second pump and the first pump,
wherein the second pump supplies fuel to the first pump,
wherein the engine speed is within a predetermined speed window,
wherein the first commanded fuel pressure signal is less than the predetermined relief pressure by a predetermined amount, and
wherein the second commanded fuel pressure signal is greater than the predetermined relief pressure by a predetermined amount.

3. The diagnostic system of claim 2, wherein the fuel pump module controls activation of the first pump and the second pump, and
wherein the second pump supplies fuel at a lower pressure than the first pump.

4. The diagnostic system of claim 2, further comprising an initialization module that generates an initialization signal when the engine has operated within a predetermined speed window for a predetermined period, wherein the diagnostic control module is enabled to detect the fault based on the initialization signal.

5. The diagnostic system of claim 2, further comprising a fuel control module that generates the first and second commanded fuel pressure signals when the engine is operating in the diagnostic mode.

6. The diagnostic system of claim 2, further comprising:

a diagnostic period timer that measures a first time difference between an initial timestamp and a current timestamp of a diagnostic event of the pressure sensor, wherein the diagnostic period timer increments a diagnostic period timer value based on the first time difference; and a stabilization period timer that measures a second time difference between an initial timestamp and a current timestamp of a stabilization event of the pressure sensor, wherein the stabilization period timer increments a stabilization period timer value based on the second time difference.

7. The diagnostic system of claim 6, further comprising a pressure detection module that generates the measured pressure signal based on the pressure of the fuel rail, wherein the pressure detection module is enabled when the stabilization period timer value is greater than a predetermined stabilization period, and wherein the pressure detection module refrains from detecting the measured pressure signal when the diagnostic period timer value is greater than a predetermined diagnostic period.

8. The diagnostic system of claim 7, wherein the fuel pump module sends a third commanded fuel pressure signal that is greater than the predetermined relief pressure to the first pump before operating in the diagnostic mode, and wherein the pressure detection module determines a corrected relief pressure of the pressure relief valve based on the measured pressure signal.

9. The diagnostic system of claim 7, wherein the diagnostic control module calculates a plurality of pressure differences between the measured pressure signal generated during the predetermined diagnostic period and at least one of the first commanded fuel pressure signal and the corrected relief pressure, wherein the diagnostic control module generates an average pressure of the plurality of pressure differences, and wherein the fault is detected when the average pressure is at least one of greater than a first predetermined offset and less than a second predetermined offset.

10. The diagnostic system of claim 7, wherein the fuel pump module increases an output pressure of the first pump from a first level to a second level based on at least one of the first commanded fuel pressure signal and the second commanded fuel pressure signal, and wherein the fuel pump module decreases the output pressure of the first pump from the second level to the first level when the diagnostic period timer value is greater than the predetermined diagnostic period.

11. A method of diagnosing a pressure sensor comprising:

activating a first pump when an engine is operating in a diagnostic mode;

supplying fuel to fuel injectors of the engine via a fuel rail;

receiving a measured pressure signal from a pressure sensor that indicates a pressure of the fuel rail during the diagnostic mode;

sending at least one of a first commanded fuel pressure signal and a second commanded fuel pressure signal to the first pump based on a predetermined relief pressure of a pressure relief valve; and detecting a fault of the pressure sensor based on an engine speed and a comparison between the measured pressure signal and at least one of the first commanded fuel pressure signal and a corrected relief pressure of the pressure relief valve.

12. The method of claim 11, further comprising:

activating a second pump and the first pump;

supplying fuel to the first pump;

detecting the engine speed that is within a predetermined speed window;

setting the first commanded fuel pressure signal to a value less than the predetermined relief pressure by a predetermined amount; and setting the second commanded fuel pressure signal to a value greater than the predetermined relief pressure by a predetermined amount.

13. The method of claim 12, further comprising:

controlling activation of the first pump and the second pump; and supplying fuel by the second pump at a lower pressure than the first pump.

14. The method of claim 12, further comprising:

generating an initialization signal when the engine has operated within a predetermined speed window for a predetermined period; and detecting the fault based on the initialization signal.

15. The method of claim 12, further comprising generating the first and second commanded fuel pressure signals when the engine is operating in the diagnostic mode.

16. The method of claim 12, further comprising:

measuring a first time difference between an initial timestamp and a current timestamp of a diagnostic event of the pressure sensor;

incrementing a diagnostic period timer value based on the first time difference;

measuring a second time difference between an initial timestamp and a current timestamp of a stabilization event of the pressure sensor; and incrementing a stabilization period timer value based on the second time difference.

17. The method of claim 16, further comprising:

generating the measured pressure signal based on the pressure of the fuel rail;

enabling the diagnostic event when the stabilization period timer value is greater than a predetermined stabilization period; and refraining from detecting the measured pressure signal when the diagnostic period timer value is greater than a predetermined diagnostic period.

18. The method of claim 17, further comprising:

sending a third commanded fuel pressure signal that is greater than the predetermined relief pressure to the first pump before operating in the diagnostic mode; and determining a corrected relief pressure of the pressure relief valve based on the measured pressure signal.

19. The method of claim 17, further comprising:

calculating a plurality of pressure differences between the measured pressure signal generated during the predetermined diagnostic period and at least one of the first commanded fuel pressure signal and the corrected relief pressure;

generating an average pressure of the plurality of pressure differences; and detecting the fault when the average pressure is at least one of greater than a first predetermined offset and less than a second predetermined offset.

20. The method of claim 17, further comprising:

increasing an output pressure of the first pump from a first level to a second level based on at least one of the first commanded fuel pressure signal and the second commanded fuel pressure signal; and decreasing the output pressure of the first pump from the second level to the first level when the diagnostic period timer value is greater than the predetermined diagnostic period.

* * * * *